(12) United States Patent
Fukumura et al.

(10) Patent No.: US 9,987,621 B2
(45) Date of Patent: Jun. 5, 2018

(54) TRANSPARENT PHOTOCATALYST COATING

(71) Applicant: Nitto Denko Corporation, Osaka (JP)

(72) Inventors: Takuya Fukumura, Carlsbad, CA (US); Ekambaran Sambandan, Carlsbad, CA (US); Rajesh Mukherjee, Irvine, CA (US)

(73) Assignee: NITTO DENKO CORPORATION, Osaka (JP)

( * ) Notice: Subject to any disclaimer, the term of this patent is extended or adjusted under 35 U.S.C. 154(b) by 465 days.

(21) Appl. No.: 13/738,243

(22) Filed: Jan. 10, 2013

(65) Prior Publication Data

US 2013/0180932 A1    Jul. 18, 2013

Related U.S. Application Data

(60) Provisional application No. 61/585,732, filed on Jan. 12, 2012.

(51) Int. Cl.
| | | |
|---|---|---|
| *B01J 27/24* | (2006.01) | |
| *B01J 23/30* | (2006.01) | |
| *B01J 37/04* | (2006.01) | |
| *B01J 35/00* | (2006.01) | |
| *B01J 35/02* | (2006.01) | |

(Continued)

(52) U.S. Cl.
CPC .............. *B01J 27/24* (2013.01); *B01J 23/30* (2013.01); *B01J 35/002* (2013.01); *B01J 35/004* (2013.01); *B01J 35/0006* (2013.01); *B01J 35/023* (2013.01); *B01J 37/0036* (2013.01); *B01J 37/0211* (2013.01); *B01J 37/04* (2013.01); *B01J 21/063* (2013.01); *B01J 23/02* (2013.01); *B01J 23/08* (2013.01); *B01J 23/10* (2013.01); *B01J 23/14* (2013.01); *B01J 23/16* (2013.01); *B01J 23/20* (2013.01); *B01J 27/22* (2013.01)

(58) Field of Classification Search
CPC . B01J 27/24; B01J 27/22; B01J 35/002; B01J 35/004; B01J 35/023; B01J 35/0006; B01J 37/0211; B01J 37/0036; B01J 37/04; B01J 23/30; B01J 23/10; B01J 23/08; B01J 23/16; B01J 23/20; B01J 23/02; B01J 23/14; B01J 21/063
See application file for complete search history.

(56) References Cited

U.S. PATENT DOCUMENTS

| | | |
|---|---|---|
| 6,037,289 A | 3/2000 | Chopin et al. |
| 6,440,278 B1 | 8/2002 | Kida et al. |

(Continued)

FOREIGN PATENT DOCUMENTS

| | | |
|---|---|---|
| CN | 1597090 A | 3/2005 |
| CN | 101259422 | 9/2008 |

(Continued)

OTHER PUBLICATIONS

Kim et al., J. Phys. Chem. C 2011, 115, 9797-9805. Published Apr. 22, 2011.*

(Continued)

*Primary Examiner* — Anthony J Zimmer
(74) *Attorney, Agent, or Firm* — K&L Gates LLP; Louis C. Cullman; Robert W. Winn

(57) ABSTRACT

Photocatalyst compositions and elements exhibiting desired photocatalytic activity levels and transparency.

22 Claims, 8 Drawing Sheets

(51) Int. Cl.

| | |
|---|---|
| B01J 23/14 | (2006.01) |
| B01J 27/22 | (2006.01) |
| B01J 21/06 | (2006.01) |
| B01J 23/02 | (2006.01) |
| B01J 23/08 | (2006.01) |
| B01J 23/10 | (2006.01) |
| B01J 23/16 | (2006.01) |
| B01J 23/20 | (2006.01) |
| B01J 37/00 | (2006.01) |
| B01J 37/02 | (2006.01) |

(56) References Cited

U.S. PATENT DOCUMENTS

| | | | |
|---|---|---|---|
| 7,521,391 B2 | 4/2009 | Sakatani et al. | |
| 7,547,357 B2 | 6/2009 | Sanbayashi et al. | |
| 7,736,735 B2 | 6/2010 | Kanamori et al. | |
| 7,892,662 B2 | 2/2011 | Veerasamy et al. | |
| 2002/0077251 A1 | 6/2002 | Okusako et al. | |
| 2003/0144140 A1* | 7/2003 | Matsuo | B01D 53/885 502/300 |
| 2003/0232186 A1 | 12/2003 | Matsuda et al. | |
| 2004/0009349 A1 | 1/2004 | Brotzman et al. | |
| 2005/0090387 A1 | 4/2005 | Niihara et al. | |
| 2005/0129591 A1 | 6/2005 | Wei | |
| 2007/0039814 A1* | 2/2007 | Maggard | 204/157.15 |
| 2009/0180941 A1* | 7/2009 | Vanderspurt | B01D 53/885 423/210 |
| 2009/0239742 A1* | 9/2009 | Vanderspurt | A61L 9/205 502/304 |
| 2009/0305878 A1 | 12/2009 | Sakatani et al. | |
| 2010/0292075 A1 | 11/2010 | Nakano et al. | |
| 2011/0082026 A1 | 4/2011 | Sakatani et al. | |
| 2011/0257298 A1 | 10/2011 | Ishihara et al. | |

FOREIGN PATENT DOCUMENTS

| | | |
|---|---|---|
| CN | 101898139 A | 12/2010 |
| CN | 102091589 A | 6/2011 |
| CN | 102470358 A | 5/2012 |
| DE | 19905546 | 8/1999 |
| JP | 2001-162176 | 6/2001 |
| JP | 2005 199187 | 7/2005 |
| JP | 2009-106897 | 5/2009 |
| JP | 2011-020009 | 2/2011 |
| WO | WO 2008009919 | 1/2008 |
| WO | WO2013106776 | 7/2013 |

OTHER PUBLICATIONS

Chang et al., Nanotechnology 22 (2011) 265603. Published May 17, 2011.*
Al-Kuhaili, "Carbon Monoxide gas-sensing properties of CeO2—WO3 thin films," Materials Science and Technology 2010, vol. 26, No. 6, 726-731.*
Takashima et al., "Photocatalytic Activity of WO3 Films Crystallized by Postannealing in Air," Japanese Journal of Applied Physics 51 (2012) 055501.*
Takada et al., "CeO2(WO3)-based thin film gas sensor for VOC detection," Chemical Sensors, vol. 20, Supplement B (2004).*
ISR and Written opinion for PCT/US2013/021318, dated Mar. 26, 2013, PCT filed Jan. 11, 2013.
Abe et al., "Pristine Simple Oxides as Visible Light Driven Photocatalysts: Highly Efficient Decomposition of Organic Compounds over Platinum-Loaded Tungsten Oxide." J. Am. Chem. Soc. 2008, 130, 7780-7781.
Guzman et al., "Spectroscopic Evidence for the Supply of Reactive Oxygen during CO Oxidation Catalyzed by Gold Supported on Nanocrystalline CeO2." J. Am. Chem. Soc. 2005, 127, 3286-3287.
Huang et al., "Role of surface peroxo and superoxo species in the low-temperature oxygen buffering of ceria: Density functional theory calculations." Physical Review B 75, 2007, pp. 081404-1 to 081404-4.

Ilan et al., "The One-Electron Transfer Redox Potentials of Free Radicals: I. The Oxygen/Superoxide System." Biochimica et Biophysica Acta, 430 (1976) 209-224.
Li et al., "Oxygen Exchange Reactions over Cerium Oxide: An FT-IR Study." Journal of Catalysis 123, 436-442 (1990).
Linsebigler et al., "Photocatalysis on TiO2 Surfaces: Principles, Mechanisms, and Selected Results." Chem. Rev. 1995, 95, 735-758.
Nagai et al., "Special Issue Oxygen Storage Materials for Automotive Catalysts—Ceria-Zirconia Solid Solutions: Research Report: Structure Analysis of CeO2—ZrO2 Mixed Oxides as Oxygen Storage Promoters in Automotive Catalysts." R & D Review of Toyota CRDL vol. 37, No. 4, p. 20-27, 2002.
Sobukawa, "Special Issue Oxygen Storage Materials for Automotive Catalysts—Ceria-Zirconia Solid Solutions: Review: Development of Ceria-Zirconia Solid Solutions and Future Trends." R & D Review of Toyota CRDL vol. 37, No. 4, p. 1-5, 2002.
WO3 / CeO2 for bromophenol blue photocatalytic degradation, supported liquid, etc., Henan University of Science and Technology, Natural Science, vol. 28, No. 3, the first 94-97 pages, Jun. 2007, Chinese and attached machine translation courtesy of google translate, translation performed Nov. 3, 2015 at translate.google.com.
Notice of Reasons for Refusal dated Jan. 21, 2016 for JP Application 2014-552352.
Pailin Ngaotrakanwiwat, et al. "Optimization of energy storage TiO2—WO3 photocatalysts and further modification with phosphotungstic acid" Journal of Electroanalytical Chemistry 573 (2004) 263-269.
Pritam Borker, et al. "Photocatalyhc degredation of textile azo dye over Ce1—xSnxO2 series" Materials Science and Engineering B (2006) 55-60.
Cuicui Zhang, et al. "Visible-light induced oxo-bridged ZrIV—O—CeIII redox centre in tetragonal ZrO2—CeO2 solid solution for degradation of organic pollutants" Physical Chemistry Chemical Physics, 2011, 13, 3896-3905.
Chinese Office Action dated Jul. 18, 2016, CN201380005340.7.
Du, Junping, et al., "WO3 Doped with Ce: Characterization and Photocatalytic Properties for Water Splitting", vol. 23, No. 6, pp. 1005-1010, Jun. 30, 2007 (Abstract).
Final Rejection drafted on May 13, 2016 and dated May 24, 2016 in the corresponding Japanese patent application No. 2014-552352 and English Translation.
Office Action dated Jun. 20, 2016 in the corresponding Taiwanese patent application No. 102101381 and English Translation.
Pedroni, M., et al., "Tungsten oxide thin film photo-anodes by reactive RF diode sputtering, 616 Thin Solid Films 375-380 (2016).
China Textile Science Research Institute, "Proceedings of the 11th Liheng Symposium of Functional Textiles, Nanotechnology Application and Low Carbon Textile", (2011), pp. 72-74.
Chinese Third Office Action dated Mar. 10, 2017 for Serial No. CN 201380005340.7.
Hashimoto, Kazhuhito et al, "Graphic Introduction on Photocatatalytic Techniques", Science Press, (2007), pp. 1850187.
Sun, Tieheng et al., "Innovation and Development: Independent Innovation and Northeast Promotion Forum, and the Second Shenyang Academic Annual Conference Proceedings", (2005), pp. 538-542.
Wang, Xin et al., "Simple Introduction on Nanoscience", Chemical Industry Press, (2010), pp. 170-171.
Chinese Fourth Office Action dated Jan. 2, 2018 for Serial No. CN 201380005340.7.
Vinu et al, Environmental remediation by photocatalysis, Journal of the Indian Institute of Science, 90(2), 189-230, 2010.
Bayati et al, A photocatalytic approach in micro arc oxidation of $WO_3$ $TiO_2$ nano porous semiconductors under pulse current, Materials Chemistry and Physics, Elsevier SA, Switzerland, Taiwan, Republic of China, 128(3), 427-432, 2011.
Yasuyoshi Sasaki et al, Solar Water Splitting Using Powdered Photocatalysts Driven by Z-Schematic Interparticle Electron Transfer without an Electron Mediator, Journal of Physical Chemistry C, 113(40), 17536-17542, 2009.

(56) References Cited

OTHER PUBLICATIONS

Horst Weller, Kolloidale Halbleiter-Q-Teilchen : Chemie im Ubergangsbereich zwischen Festkorper un MolekUl, Angewandte Chemie, Wiley—V C H Verlag GmbH & Co. KGAA, DE, 105(1), 43-55, 1993.

Nilofar Asim et al: New Developments in photocatalysts modification: case study of $WO_3$ Advances in Fluid Mechanics and Heat & Mass Transfer 110-116, 2012.

Tsumura T et al, Preparation of $SrTiO_3$-supported $TiO_2$ photocatalyst, Materials Science and Engineering Elsevier Sequoia, Lausanne, 157(1-3), 113-115, 2009.

Otsuka-Yao-Matsuo S et al, Photocatalytic behavior of cerium titanates, $CeTiO_4$ and $CeTi_2O_6$ and their composite powders with $SrTiO_3$, Journal of Alloys and Compounds, Elsevier Sequoia, Lausanne, 376(1-2), 262-267, 2004.

Liu et al, Photocatalytic mechanism of $TiO_2$—$CeO_2$ films prepared by magnetron sputtering under UV and visible light, Surface Science, 595, 203-211, 2005.

Lin Y et al, Preparation of highly dispersed $CeO_2/TiO_2$ core-shell nanoparticles, Materials Letters, North Holland Publishing Company, 62, 3764-3766, 2008.

Otsuka-Yao-Matsuo S et al, Visible light-induced photobleaching of methylene blue aqueous solution using $(Sr_{1-x}La_x)TiO_3$+delta-$TiO_2$ composite powder, Journal of Photochemistry and Photobiology, A: Chemistry, Elsevier Sequoia, Lausanne, 168(1-2), 1-9, 2004.

Bo et al, Effect of metal doping into $Ce_{0.5}Zr_{0.5}O_2$ on photocatalytic activity of $TiO_2/Ce_{0.45}Zr_{0.45}M_{0.10}X$ (M=Y, La, Mn), Journal of Hazardous Materials, Elsevier, Amsterdam, NL, 143(1-2), 516-521, 2007.

Nagaveni et al., Structure and Photocatalytic Activity of $Ti_{1-x}$ M x 02 delta synthesized by Solution Combustion Method, The Journal of Physical Chemistry, 108(52), 20204-20212, 2004.

Chinese Office Action dated Sep. 29, 2015 in the Chinese patent application No. 201380005340.7.

Extended European Search Report dated Dec. 17, 2015 for European patent application No. 13735689.5.

* cited by examiner

TRANSPARENT PHOTOCATALYST COATING

CROSS-REFERENCE

This application claims the benefit of U.S. provisional application No. 61/585,732, filed on Jan. 12, 2012, which is incorporated by reference herein in its entirety.

BACKGROUND

Visible-light activated photocatalysts can be deployed for self-cleaning, air and water purification and many other interesting applications usually without any post-deployment non-renewable energy costs. This is because the photocatalysts are able to decompose pollutants (like dyes, volatile organic compounds and $NO_x$) using available ambient light like solar radiation or indoor and outdoor lighting. With the anticipated rapid adoption of UV-free indoor lighting (like LEDs and OLEDs), it is imperative to find ways to deploy visible-light activated photocatalysts in indoor applications for instance in cleaning room air in domestic, public and commercial spaces especially in confined spaces like aircrafts, public buildings, etc. Moreover, additional applications for antibacterial surfaces and self-cleaning materials can have wide applicability in the food service, transportation, health care and hospitality sectors.

Generally, photocatalytic coatings exhibit low photocatalytic activity, primarily due to low inherent activity of the base photocatalyst material as well as their incompatibility with the often used binders. Thus, there is a need for photocatalytic coatings and/or layers that exhibit desired photocatalytic levels and transparency.

SUMMARY

Photocatalytic compositions that include a photocatalyst and a co-catalyst may be useful for a variety of photocatalytic applications. Additionally, a co-catalyst may improve the photocatalytic activity of a photocatalyst, so that combination of a photocatalyst and a co-catalyst is more active than a photocatalyst alone. Furthermore, incorporation of photocatalytic material co-catalysts into photocatalytic coatings may help to improve the transparency and photocatalytic activity of the coating material.

In some embodiments, the photocatalyst can be Ti-based. In some embodiments, the photocatalyst can be visible light responsive. In some embodiments, the photocatalyst can be titanium dioxide, a doped titanium oxide or a composite titanium oxide material powder.

In some embodiments, the photocatalyst can be W-based. In some embodiments, the photocatalyst can be visible light responsive. In some embodiments, the photocatalyst can be tungsten oxide, a doped tungsten oxide powder, or a tungsten oxide composite material powder.

In some embodiments, the photocatalyst can both be W-based and Ti based. In some embodiments, the photocatalyst can be visible light responsive. In some embodiments, the photocatalyst can be a combination of at least one of a tungsten oxide, a doped tungsten oxide powder or a tungsten oxide composite material powder and at least one of titanium dioxide, a doped titanium oxide or a composite titanium oxide material powder.

Some embodiments include a photocatalytic layer including the aforementioned photocatalytic composition. Some embodiments can further include a substrate, at least a portion of the photocatalytic material contacting the substrate.

Some embodiments include a transparent photocatalytic composition including at least one photocatalyst material and at least one co-catalyst, the photocatalyst material and the co-catalyst having refractive indices within about 0.75 of each other.

Some embodiments include a method of making a photocatalytic layer including forming the aforementioned compositions; and applying the compositions to a substrate.

Some embodiments include a method for making a photocatalytic layer including creating a dispersion comprising a photocatalyst, $CeO_2$, and a dispersing media wherein the respective photocatalyst and $CeO_2$ refractive indices are within 0.75 of each other, the molar ratio of the photocatalyst to $CeO_2$ being between 1-99 molar % photocatalyst and 99-1 molar % $CeO_2$; wherein the dispersion has about 2-50 wt % solid materials; applying the dispersion to a substrate; and heating the dispersion and the substrate at a sufficient temperature and for a length of time to evaporate substantially all the dispersing media from the dispersion.

Some embodiments include a method of purifying air or water, comprising exposing the air or water to light in the presence of a photocatalytic composition described herein.

Some embodiments include a method of removing a pollutant, comprising exposing a material comprising the pollutant to light in the presence of a photocatalytic composition described herein.

These and other embodiments are described in more detail herein.

DETAILED DESCRIPTION

Figure 1:
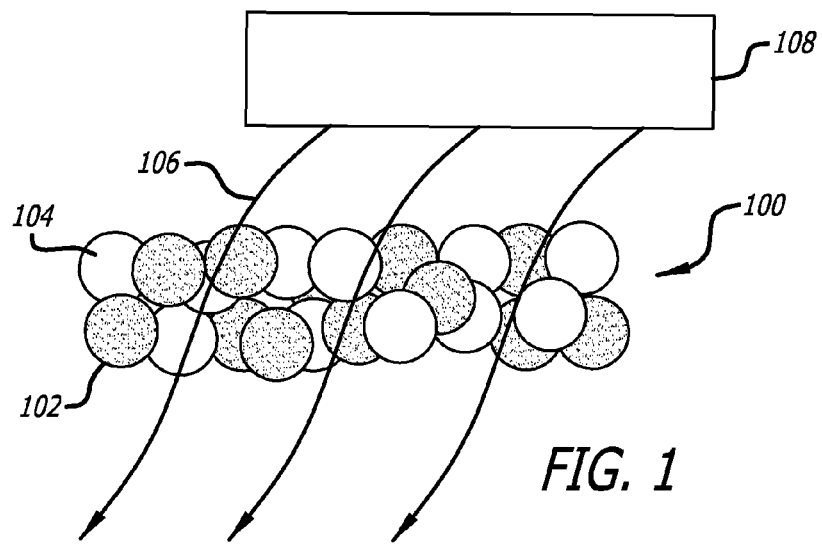
FIG. 1 is a schematic depiction of an embodiment of a photocatalytic coating.

A photocatalyst includes any material that can activate or change the rate of a chemical reaction as a result of exposure to light, such as ultraviolet or visible light. In some embodiments photocatalyst material may be an inorganic solid, such as a solid inorganic semiconductor, that absorbs ultraviolet or visible light. For some materials, photocatalysis may be due to reactive species (able to perform reduction and oxidation) being formed on the surface of the photocatalyst from the electron-hole pairs generated in the bulk of the photocatalyst by said absorption of electromagnetic radiation. In some embodiments, the photocatalyst has a conduction with an energy of about 1 eV to about 0 eV, about 0 eV to about −1 eV, or about −1 eV to about −2 eV, as compared to the normal hydrogen electrode. Some photocatalyst may have a valence band with energy of about 3 eV to about 3.5 eV, about 2.5 eV to about 3 eV, or about 2 eV to about 3.5 eV, or about 3.5 eV to about 5.0 eV as compared to the normal hydrogen electrode.

Traditionally, photocatalysts could be activated only by light in the UV regime i.e. wavelength less than 380 nm. This is because of the wide bandgap (>3 eV) of most semiconductors. However, in recent years by appropriately selecting materials or modifying existing photocatalysts, visible light photocatalysts have been synthesized (Asahi et al., Science, 293: 269-271, 2001 and Abe et al., Journal of the American Chemical Society, 130(25): 7780-7781, 2008). A visible light photocatalyst includes a photocatalyst which is activated by visible light, e.g. light that is normally visually detectable by the unaided human eye, such as at least about 380 nm in wavelength. Visible light photocatalysts can also be activated by UV light below 380 nm in wavelength in addition to visible wavelengths. Some visible light photocatalyst may have a band gap that corresponds to light in the visible range, such as a band gap greater than about 1.5 eV, less than about 3.5 eV, about 1.5 eV to about 3.5 eV, about 1.7 eV to about 3.3 eV, or 1.77 eV to 3.27 eV.

Some photocatalyst may have a band gap of about 1.2 eV to about 6.2 eV, about 1.2 eV to about 1.5 eV, or about 3.5 eV to about 6.2 electron eV.

Some photocatalysts include oxide semiconductors such as $TiO_2$, ZnO, $WO_3$, $SnO_2$, etc., and modifications thereof. Contemplated modifications include doping and/or loading. Other materials like complex oxides ($SrTiO_3$, $BiVO_4$) and some sulfides (CdS, ZnS), nitrides (GaN) and some oxynitrides (e.g. ZnO:GaN) may also display photocatalytic properties. Photocatalysts can be synthesized by those skilled in the art by a variety of methods including solid state reaction, combustion, solvothermal synthesis, flame pyrolysis, plasma synthesis, chemical vapor deposition, physical vapor deposition, ball milling, and high energy grinding.

In some embodiments, the photocatalyst can be an oxide semiconductor. In some embodiments, the photocatalyst can be a titanium (Ti) compound, such as a titanium oxide, oxycarbide, oxynitride, oxyhalide, or halide, including a titanium compound or oxide having a +1, +2, +3, +4, +5, or +6 oxidation state or formal charge, or an average oxidation state or formal charge of about +1 to about +6, about +2 to about +4, about +1 to about +2, or about +4 to about +6.

In some embodiments, the photocatalyst can be a tungsten (W) compound, such as a tungsten oxide, oxycarbide, oxynitride, oxyhalide, or halide, including a tungsten compound or oxide having a +1, +2, +3, +4, +5, +6, +7, or +8 oxidation state or formal charge, or an average oxidation state or formal charge of about +1 to about +8, about +4 to about +8, about +6 to about +8, or about +1 to about +4.

In some embodiments, the respective Ti or W compounds can be a respective oxide, oxycarbide, oxynitride, oxyhalide, halide, salt, doped or loaded compound. In some embodiments, the respective Ti or W compounds can be $TiO_2$, $WO_3$, or $Ti(O,C,N)_2$:Sn, such as $Ti(O,C,N)_2$:Sn wherein the molar ratio of Ti:Sn is about 90:10 to about 80:20, about 85:15 to about 90:10, or about 87:13. In some embodiments, the respective Ti or W compounds can be nanopowders, nanoparticles, and or layers comprising the same. In some embodiments, the photocatalyst may include ZnO, $ZrO_2$, $SnO_2$, $CeO_2$, $SrTiO_3$, $BaTiO_3$, $In_2O_3$, $Cu_xO$, $Fe_2O_3$, ZnS, $Bi_2O_3$, or $BiVO_4$. In some embodiments, the photocatalyst comprises $TiO_2$. In some embodiments, the photocatalyst comprises anatase $TiO_2$. In some embodiments, the photocatalyst does not include $TiO_x$. In some embodiments, the photocatalyst does not include $TiO_2$.

Any useful amount of photocatalyst may be used. In some embodiments, the photocatalyst material is at least about 0.01 molar % and less than 100 molar % of the composition. In some embodiments, the photocatalyst material is about 20 molar % to about 80 molar %, about 30 molar % to about 70 molar %, about 40 molar % to about 60 molar %, or about 50 molar % of the composition.

$TiO_2$ and $WO_3$ compounds, e.g., nanopowders, can be prepared by many different methods including thermal plasma (direct current and including radio frequency inductively-coupled plasma (RF-ICP)), solvothermal, solid state reaction, pyrolysis (spray and flame), and combustion. Radio frequency inductively-coupled plasma (e.g. thermal) methods as described in U.S. Pat. No. 8,003,563, which is included herein its entirety by reference, may be useful because of low contamination (no electrodes) and high production rates and facile application of precursors either in the gas, liquid or solid form. Hence, radio frequency inductively-coupled plasma processes are preferred. For example, when preparing $WO_3$ nanopowders, a liquid dispersion of ammonium metatungstate in water (5-20 wt % solid in water) can be sprayed into the plasma volume using a two-fluid atomizer. Preferably, the precursor can be present to about 20 wt % solid in water. The plasma can be operated at about 25 kW plate power with argon, nitrogen and/or oxygen gases. The particles formed from the condensed vapor from the plasma can then be collected on filters. In some embodiments, the particle surface areas range as measured using BET from about 1 $m^2$/g to about 500 $m^2$/g, about 15 $m^2$/g to 30 $m^2$/g, or about 20 $m^2$/g. In some embodiments, the obtained $WO_3$ may be heated from about 200° C. to about 700° C. or about 300° C. to about 500° C.

In some embodiments, a photocatalyst can be doped with at least one naturally occurring element e.g. non-noble gas elements. Doped elements can be provided as precursors added generally during synthesis. Doped elements can be elements that are incorporated into the crystal lattice of the Ti or W compound, for example as substituted within defined positions within the crystal lattice or otherwise interstitially included within the crystal. In some embodiments, the dopant can be selected from one of more elements including alkali metals like Li, Na, K, Cs; alkali earth metals like Mg, Ca, Sr, Ba; transition metals like Fe, Cu, Zn, V, Ti (for W-based compounds), W (for Ti-based compounds), Mo, Zr, Nb, Cr, Co, and Ni; lanthanide and actinide metals; halogens; Group III elements (from the Dmitri Mendeleev/Lothar Meyer style modern periodic table with elements arranged according to increasing atomic number) including B, Al, Ga, In and Tl, Group IV elements including Ca, Si, Ge, Sn; Group V elements like N, P, Bi; and Group VI elements like S and Se. In some embodiments, the photocatalyst can be doped with at least one element selected from C, N, S, F, Sn, Zn, Mn, Al, Se, Nb, Ni, Zr, Ce and Fe. In some embodiments, the photocatalyst may be self-doped e.g., $Ti^{3+}$ in place of $Ti^{4+}$ in a $TiO_2$ matrix. Details of suitably doped photocatalytic materials are presented in the U.S. Provisional Patent Application No. 61/587,889, which is hereby incorporated by reference in its entirety.

In some embodiments, the photocatalytic material can be comprise one or more of n-type UV photocatalytic material, n-type visible light photocatalytic material, p-type UV photocatalytic material and/or p-type visible photocatalytic material. In some embodiments, the n-type visible band gap semiconductors can optionally be $WO_3$, $Ti(O,C,N)_2$:Sn, or $CeO_2$. In some embodiments, the n-type UV photocatalytic material can optionally be $CeO_2$, $TiO_2$, $SnO_2$, $SrTiO_3$, $ATaO_3$, $ANbO_3$ etc.; A=alkali metal ion, wherein A can Ca, Ba, and/or Sr. In some embodiments, p-type visible band gap semiconductors can optionally be SiC, $CuMO_2$, M=Al, Cr. In some embodiments, the p-type UV photocatalytic material can optionally be $ZnIrO_2$, $ZnRhO_2$, CuO, NiO, $Mn_2O_3$, $Co_3O_4$, and/or $Fe_2O_3$.

In some embodiments, the photocatalyst can be loaded with at least one metal. Loaded elements can be provided by post synthesis methodologies like impregnation (Liu, M., Qiu, X., Miyauchi, M., and Hashimoto, K., *Cu(II) Oxide Amorphous Nanoclusters Grafted $Ti^{3+}$ Self-Doped $TiO_2$: An Efficient Visible Light Photocatalyst*. Chemistry of Materials, published online 2011), photoreduction (Abe et al., Journal of the American Chemical Society, 130(25): 7780-7781, 2008), and sputtering. As a preferred embodiment, loading metals on photocatalysts may be carried out as described in US Patent Publication Number US2008/0241542 which is incorporated here in its entirety by reference. In some embodiments, the loaded element is selected from noble elements. In some embodiments, the loaded element can be selected from at least one noble element, oxide, and/or hydroxide. In some embodiments, the noble elements can be selected from Au, Ag, Pt, Pd, Ir, Ru, Rh or their oxides and/or hydroxides. In some embodiments, the loaded element is selected from transition metals, their oxides and/or hydroxides. In some embodiments, the loaded element is selected from Fe and Cu and Ni or their oxide and hydroxides. In some embodiments, the loaded elements may be chosen from different groups of elements including at least one transition metal and at least one noble metal or their respective oxides and hydroxides A co-catalyst includes a material that enhances the photocatalytic properties of a photocatalyst. Co-catalysts may also be generically referred to as T-Binder throughout this document. In some embodiments, a co-catalyst may improve catalytic performance. For example a co-catalyst may increase a rate of catalysis by at least about 1.2, at least about 1.5, at least about 1.8, at least about 2, at least about 3, or at least about 5. One method of quantifying rate of catalysis may include determining a rate of decomposition of an organic compound, such as acetaldehyde. For example, if the concentration of acetaldehyde were photocatalyically decreased to 80% of its original value after 1 hour, or by 20%, an increase in the rate of catalysis of about 2 would result in the amount of acetaldehyde being decreased to 60% of its original value after 1 hour, or by 40%. A rate of catalysis may be measured as a decrease in a compound such as acetaldehyde due to composition, at a given time point, such as about 0.5 hours, 1 hour, 1.5 hours, 2 hours, 2.5 hours, 3 hours, or 5 hours after the photocatalysis is initiated.

Some co-catalyst may be compounds or semiconductors that are capable of being reduced by electron transfer from the conduction band of the photocatalyst. For example, a co-catalyst may have a conduction band having a lower energy than the conduction band of the photocatalyst, or a co-catalyst may have a lowest unoccupied molecular orbital having a lower energy than the conduction band of the photocatalyst. When a term such as "lower energy" and "higher energy" is used to compare a band of a semiconductor or a molecular orbital with another band or molecular orbital, it means that an electron loses energy when it is transferred to the band or molecular orbital of lower energy, and an electron gains energy when it is transferred to the band for molecular orbital of higher energy.

It is believed that some metal oxides that are co-catalysts are capable of reducing $O_2$. For example, it is believed that $CeO_2$ can reduce $O_2$ gas by electron transfer. In doing so, it is believed that $Ce^{3+}$ transfers an electron to $O_2$ and is converted to $Ce^{4+}$ as a result. In a photocatalyst composition, a photocatalyst may transfer an electron to $CeO_2$, thus converting $Ce^{4+}$ to $Ce^{3+}$, and the $Ce^{3+}$ may then reduce $O_2$. $Ce^{3+}$ may also be present as a result of equilibrium processes involving $CeO_2$ and $O_2$, and superoxide radical ion ($O_2^-$). $O_2$ and superoxide radical ion in such an equilibrium process may be adsorbed to the surface of solid $CeO_2$ or present in the atmosphere. $Ce^{3+}$ may also be present as a result of oxidation and reduction reactions with cerium species of different oxidation states that may be added intentionally or present as impurities.

Some co-catalysts may be capable of converting atmospheric $O_2$ to superoxide radical ion. For example, $CeO_2$ is capable of converting atmospheric oxygen to superoxide radical ion. It is believed that some of the equilibrium and/or electron transfer processes described above may contribute to this property of $CeO_2$. Such a conversion may occur under a variety of conditions, such as ambient conditions, including for example, normal atmospheric oxygen concentrations, such as molar concentrations of about 10% to about 30%, about 15% to about 25%, or about 20% oxygen; ambient temperature, such as about 0° C. to about 1000° C., about 0° C. to about 100° C., about 10° C. to about 50° C., or about 20° C. to about 30° C.; and pressure, such as about 0.5 to about 2 atm, about 0.8 atm to about 1.2 atm, or about 1 atm. Such a conversion may also occur under elevated or reduced temperature, pressure, or oxygen concentration. Other materials that may be capable of reducing $O_2$ or converting atmospheric $O_2$ to superoxide radical ion include various other materials such as $Ce_xZr_yO_2$ (where x:y=0.99–0.01), $BaYMn_2O_{5+\delta}$, and lanthanide-doped $CeO_2$ including $Ce_xZr_yLa_zO_2$, $Ce_xZr_yPr_zO_2$, and $Ce_xSm_yO_2$.

Some co-catalysts may have a valence band or a highest occupied molecular orbital at a higher energy than a valence band of the photocatalyst. This may allow a hole in a valence band of the photocatalyst to be transferred to a highest occupied molecular orbital or a valence band of the co-catalyst. The hole in the valence band or highest occupied molecular orbital of co-catalyst may then oxidize $H_2O$ or $OH^-$ to OH. For example, if $WO_3$ is chosen as a photocatalyst, examples of such a co-catalyst may include anatase $TiO_2$, $SrTiO_3$, $KTaO_3$, SiC or $KNbO_3$.

In some embodiments, the co-catalyst can be inorganic. In some embodiments, the inorganic co-catalyst can be a binder. In some embodiments, the co-catalyst can be an oxide, such as a metal dioxide, including $CeO_2$, $TiO_2$, or the like.

In some embodiments, the co-catalyst can comprise CuO, $MoO_3$, $Mn_2O_3$, $Y_2O_3$, $Gd_2O_3$, $TiO_2$, $SrTiO_3$, $KTaO_3$, SiC, $KNbO_3$, $SiO_2$, $SnO_2$, $Al_2O_3$, $ZrO_2$, $Fe_2O_3$, $Fe_3O_4$, NiO, $Nb_2O_5$, $In_2O_5$, $Ta_2O_5$, or $CeO_2$. In some embodiments, the co-catalyst comprises $In_2O_5$, $Ta_2O_5$, anatase $TiO_2$, rutile $TiO_2$, a combination of anatase and rutile $TiO_2$, or $CeO_2$. In some embodiments, the co-catalyst comprises $TiO_2$. In some embodiments, the co-catalyst comprises anatase $TiO_2$. In some embodiments, the co-catalyst does not include $Cr_2O_3$, $CeO_2$, $Al_2O_3$, or $SiO_2$. In some embodiments, the co-catalyst does not include $Cr_2O_3$. In some embodiments, the co-catalyst does not include $CeO_2$. In some embodiments, the co-catalyst does not include $Al_2O_3$. In some embodiments, the co-catalyst does not include $SiO_2$.

In some embodiments, the co-catalyst can be $Re_rE_tO_s$, $Re_rE_tO$, or $Re_rE_tO_2$, wherein in Re is a rare earth element, E is an element or a combination of elements, and O is oxygen; and r is 1 to 2, such as about 1 to about 1.5 or about 1.5 to about 2; s is 2 to 3, such as about 1 or about 2; and t is 0 to 3, such as about 0.01 to about 1, about 1 to about 2, or about 2 to about 3. In some embodiments, the co-catalyst can be $Re_rO_s$ where Re can be a rare earth metal and r can be greater than or equal to 1 and less than or equal to 2, or can be between 1 and 2 and s can be greater than or equal to 2 and less than or equal to 3 or can be between 2 and 3. Examples of suitable rare earth elements include scandium, yttrium and the lanthanide and actinide series elements. Lanthanide elements include elements with atomic numbers 57 through 71. Actinide elements include elements with atomic numbers 89 through 103. In some embodiments, the co-catalyst can be $Ce_xZr_yO_2$ wherein the y/x ratio=0.001 to 0.999. In some embodiments, the co-catalyst can include cerium, such as a cerium oxide including a cerium oxide having a +1, +2, +3, +4, +5, or +6 oxidation state or formal charge, or an average oxidation state or formal charge of about +1 to about +6, about +2 to about +4, about +1 to about +2, or about +4 to about +6. In some embodiments, the co-catalyst can be $CeO_a$ (a≤2). In some embodiments, the co-catalyst can be CeO. In some embodiments, the co-catalyst can be cerium oxide ($CeO_2$).

In some embodiments, the co-catalyst is $CeO_2$ doped with Sn, such as about 1 molar % to about 50 molar %, about 5 molar % to about 15 molar %, or about molar 10% Sn, based upon the total number of moles of co-catalyst.

In some embodiments, the photocatalyst can be $WO_3$ and the co-catalyst can be $CeO_a$ (a≤2).

In some embodiments, the co-catalyst maybe a Keggin unit e.g. ammonium phosphomolybdate (($NH_4$)$_3$ [$PMo_{12}O_{40}$]), 12-phosphotungstic acid, silicotungstic acid and phosphomolybdic acid. The overall stability of the Keggin unit allows the metals in the anion to be readily reduced. Depending on the solvent, acidity of the solution and the charge on the α-Keggin anion, it can be reversibly reduced in one- or multiple electron step.

In some embodiments, the photocatalytic layer can be formed of the materials described herein.

While not wanting to be limited by theory, the inventors believe that $CeO_2$ may be useful in conjunction with tungsten oxide because of the relative band positions of these materials. Furthermore, it is noteworthy that the index of refraction of $CeO_2$ is substantially the same as tungsten oxide, about 90% to about 110%. In another embodiment about 95% to about 105%. In some embodiments, the high transparency of the photocatalytic compositions can provide a composition/layer/element of transparency greater than about 50%, 60%, 65% and/or 70%. The low scattering losses due to matched refractive indices contributes directly to a transparent composition.

Any useful ratio of photocatalyst to co-catalyst may be used. In some embodiments a photocatalytic composition may have a molar ratio (photocatalyst:co-catalyst) of about 1:5 to about 5:1, about 1:3 to about 3:1, about 1:2 to about 2:1, or about 1:1.

In some embodiments, a composition can comprise tungsten oxide and a rare earth oxide at a molar ratio of about 0.5:1 to 2:1 or about 1:1 (tungsten oxide:rare earth oxide). In some embodiments, the rare earth oxide is cerium oxide ($CeO_2$). In some embodiments, the photocatalytic composition may include $WO_3$ and $CeO_2$, having a molar ratio ($WO_3$:$CeO_2$) of about 1:5 to about 5:1, about 1:3 to about 3:1, about 1:2 to about 2:1, or about 1:1.

FIG. 1 is a schematic representation of the structure of some embodiments of elements described herein. A transparent photocatalytic composition 100 is formed of a photocatalyst material 102 and a co-catalyst 104. Light waves 106 are emitted from a source 108 external to transparent photocatalytic composition 100 in a direction through it. In some embodiments, a photocatalytic element is provided, the element comprising the aforementioned transparent photocatalytic composition 100. In some embodiments, the element can be a layer. In some embodiments, the element can be a coating disposed over a substrate, In some embodiments, the source 108 may be transparent photocatalytic composition 100 including at least one of photoluminescent (phosphorescent or fluorescent), incandescent, electro- or chemo- or sono- or mechano- or thermo-luminescent materials. Phosphorescent materials may include ZnS and aluminum silicate whereas fluorescent materials may include phosphors like YAG-Ce, $Y_2O_3$—Eu, various organic dyes etc. Incandescent materials may include carbon, tungsten while electroluminescent materials may include ZnS, InP, GaN, etc. It will be evident to one of ordinary skill in the art that any other kind of light generation mechanism would suffice for providing the energy to initiate photocatalysis e.g. sunlight, fluorescent lamp, incandescent lamp, light-emitting diode (LED) based lighting, sodium vapor lamp, halogen lamp, mercury vapor lamp, noble gas discharges, and flames.

Figure 2:
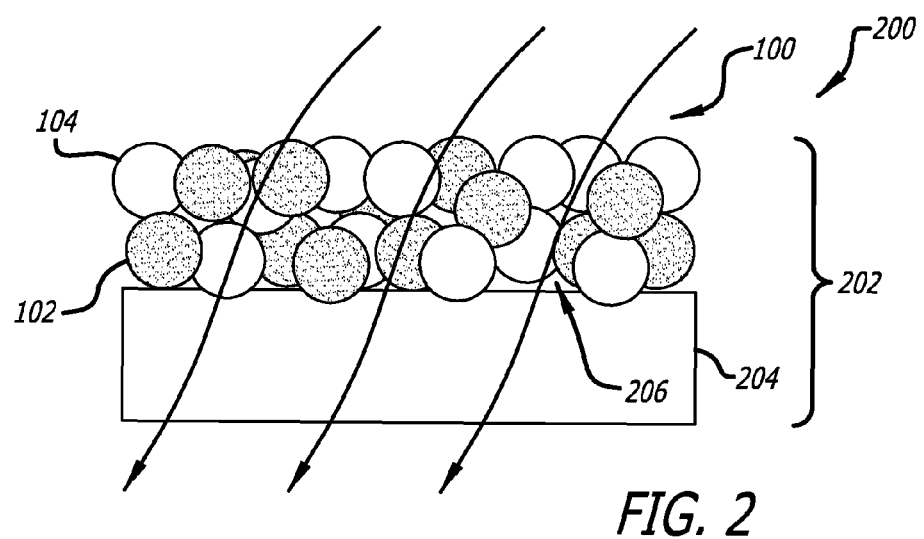
FIG. 2 is a schematic depiction of an embodiment of a photocatalytic coated surface.

FIG. 2 is a schematic representation of a system 200 of some embodiments of the elements described herein. In some embodiments, a transparent photocatalytic element 202 is provided including a substrate 204 and transparent photocatalytic composition 100, the composition including at least one photocatalyst material 102 and a co-catalyst 104 contacting, at least in part, substrate 204. In some embodiments, transparent photocatalytic composition 100 can be applied to or disposed upon substrate 204, at least a portion of transparent photocatalytic composition 100 contacting surface 206 of substrate 204 or a portion thereof. In some embodiments, photocatalyst material 102 and a co-catalyst 104 can have refractive indices within about 0.75, about 0.50, about 0.20, or about 0.05 of each other. For example, in one embodiment, where the at least one photocatalyst material 102 can be $WO_3$ and co-catalyst 104 can be $CeO_2$, the respective refractive indices are 2.20 and 2.36.

In some embodiments, the photocatalytic composition is coated to a substrate in such a way that the photocatalyst composition can come into contact with light and material to be decomposed.

By being disposed upon the substrate, the photocatalytic composition can be a separately formed layer, formed prior to disposition upon the substrate. In another embodiment, the photocatalytic composition 100 can be formed upon the substrate surface, e.g., by vapor deposition like either chemical vapor deposition (CVD) or physical vapor deposition (PVD); laminating, pressing, rolling, soaking, melting, gluing, sol-gel deposition, spin coating; dip coating; bar coating; slot coating; brush coating; sputtering; thermal spraying including flame spray, plasma spray (DC or RF); high velocity oxy-fuel spray (HVOF) atomic layer deposition (ALD); cold spraying or aerosol deposition. In another embodiment, the photocatalytic composition can be incorporated into the surface of the substrate, e.g., at least partially embedded within the surface.

In some embodiments, the photocatalyst composition substantially covers the substrate 204. In some embodiment, the photocatalyst composition contacts or covers at least about 75%, at least about 85%, or at least about 95% of the substrate surface 206.

A larger surface area may translate into higher photocatalytic activity. In one embodiment, the Brunner Emmett Teller BET specific surface area of the photocatalyst is between 0.1-500 $m^2/g$. In another embodiment, the BET specific surface area of the photocatalyst is between 10-50 $m^2/g$.

In another embodiment, a photocatalytic layer is provided including the aforementioned compositions of tungsten oxide to rare earth oxide.

In another embodiment, there is a method for making a photocatalytic composition including creating a dispersion comprising a photocatalyst, $CeO_2$, and a dispersing media, wherein the respective photocatalyst and $CeO_2$ refractive indices are within at least 0.75 of each other, the molar ratio of the photocatalyst to $CeO_2$ being between 1-99 molar % photocatalyst and 99-1 molar % $CeO_2$; wherein the dispersion has about 2-50 wt % solid materials; applying the dispersion to a substrate; and heating the dispersion and the substrate at a sufficient temperature and length of time to evaporate substantially all the dispersing media from the dispersion. In some embodiments, the dispersion is applied to cover the substrate, either in whole or in part, or to a surface of the substrate to create a coating or surface layer.

In another embodiment, there is a method for making a photocatalytic composition including mixing an aqueous dispersion of a visible light photocatalyst and $CeO_2$, the ratio of the photocatalyst to $CeO_2$ being between 40-60 molar % photocatalyst and 60-40 molar % $CeO_2$; adding sufficient dispersing media, e.g. water, to attain a dispersion of about 10-30 wt % solid materials; applying the dispersion to a substrate; and heating the substrate at a sufficient temperature and length of time to evaporate substantially all the water from the dispersion and the substrate. In some embodiments the $CeO_2$ can be a sol. In some embodiments, the photocatalyst material is added to the $CeO_2$ sol. In some embodiments, the $CeO_2$ is added to a photocatalyst dispersion. In some embodiments, both the photocatalyst dispersion and $CeO_2$ sol or dispersion are prepared separately and then mixed together to create the dispersion.

In another embodiment, the ratio of the photocatalyst to $CeO_2$ may be about 2:3 to about 3:2, such as between 40-60 molar % photocatalyst and 60-40 molar % $CeO_2$. In another embodiment, the ratio of photocatalyst to $CeO_2$ is about 1:1 [50 molar % to 50 molar %]. In some embodiments, the $CeO_2$ is a sol.

In another embodiment, the amount of dispersing media, e.g. water, added is sufficient to attain a dispersion of about 2-50 wt %, about 10-30 wt %, about 15-25 wt % solid materials. In another embodiment, the amount of dispersing media, e.g., water, added is sufficient to attain a dispersion of about 20 wt % solid materials In another embodiment, the mixture covered substrate is heated at a sufficient temperature and/or sufficient length of time to substantially remove the dispersing media. In some embodiments at least 90%, at least 95%, at least 99% of the dispersing media is removed. In another embodiment, the dispersion covered substrate is heated at a temperature between about room temperature and 500° C. In another embodiment, the dispersion covered substrate is heated to a temperature between about 90° C. and about 150° C. In another embodiment, the dispersion covered substrate is heated to a temperature of about 120° C. While not wanting to be limited by theory, it is believed that keeping the temperature below 500° C. may reduce the possibility of thermal deactivation of the photocatalytic material, for example due to photocatalytic material phase change to a less active phase (highly-active anatase $TiO_2$ to less active rutile), dopant diffusion, dopant inactivation, loaded material decomposition or coagulation (reduction in total active surface area).

In another embodiment, the dispersion covered substrate is heated for a time between about 10 seconds and about 2 hours. In another embodiment, the mixture covered substrate is heated for a time of about 1 hour.

The dispersions described herein can be applied to virtually any substrate. Other methods of applying the dispersion to a substrate can include slot/dip/spin coating, brushing, rolling, soaking, melting, gluing, or spraying the dispersion on a substrate. A proper propellant can be used to spray a dispersion onto a substrate.

In some embodiments, the substrate need not be capable of transmitting light. For example, the substrate may be a common industrial or household surface on which a dispersion can be directly applied. Substrates can include, glass (e.g., windows), walls (e.g., drywall), stone (e.g., granite counter tops), masonry (e.g., brick walls), metals (e.g. stainless steel), woods, plastics, other polymeric surfaces, ceramics, and the like. Dispersions in such embodiments can be formulated as paints, liquid adhesives, on tape, on wallpapers, on drapes, on lamp shades, on light covers, on table or counter surface coverings, and the like.

A photocatalyst composition may be capable of photocatalytically decomposing an organic compound, such as an aldehyde, including acetaldehyde formaldehyde, propionaldehyde, etc.; a hydrocarbon, such as an alkane, including methane, ethane, propane, butane, etc.; an aromatic hydrocarbon, such as benzene, naphthalene, anthracene, etc.; crude oil, or fraction thereof; dyes such as anthocyanins, methylene blue, basic blue 41; volatile organic compounds, such as methane, ethane, propane, butane, benzene, toluene, acetone, diethyl ether, methanol, ethanol, isopropyl alcohol, formaldehyde, ethyl acetate, xylene, etc.; $NO_x$, such as NO, $NO_2$, $N_2O$, HONO, $SO_x$, such as $SO_2$, $SO_3$, etc.; CO, $O_3$; etc., small organic molecules such as caffeine, diclofenac, ibuprofen, geosmin, flumequine, etc., bacteria such as *Escherichia coli, Staphylococcus aureus, Acinetobactor, Pseudomonas aeruginosa* etc., virus such as MS2, influenza, norovirus, etc., bacterial spores such as *Clostridium difficile*, protozoa such as *Giardia*, etc., and fungi such as *Candida*, etc Photocatalytic decomposition may occur in a solid, liquid, or a gas phase.

To test the photocatalytic ability of a photocatalyst composition, gas-phase decomposition of acetaldehyde was used. A photocatalyst sample is dispersed in water or other solvent including methanol or ethanol. A binder may be added to this dispersion in such a way as to produce a final dispersion with 10-50% solid content. The dispersed sample can be homogenized using an ultrasonic probe. The dispersion can then be applied on a substrate. The substrate-applied dispersion combination can then be heated to about 120° C., thereby evaporating substantially all of the dispersant. Thereafter it can be subjected to high intensity UV illumination for about one hour for producing a pristine photocatalyst surface.

This photocatalyst composition/substrate can be placed in a Tedlar Bag (5 L) which can then be filled with about 3 L air from a compressed air source. Thereafter, acetaldehyde from a calibration-grade source can be added to achieve a final acetaldehyde concentration of about 80 ppm as measured using a calibrated gas chromatograph equipped with a high sensitivity flame ionization detector (GC-FID).

This gas bag sample can be equilibrated in the dark for about an hour and gas chromatography and flame ionization detection (GC-FID) can be used to confirm a stable concentration of acetaldehyde. A monochromatic blue light-emitting diode array (455 nm) with 200 mW/cm² intensity of illumination at the exposure plane can be then used to irradiate the bag. Gas samples can be collected from the bag using an automated system and analyzed using the GC-FID. Temporal variation of the concentration of acetaldehyde can be determined from the area under the corresponding peak of the chromatogram. Other suitable gas detection scheme like Gastec gas detection tubes may also be used for determining the acetaldehyde concentration in the bag.

The gas decomposition rate (%) can be set as a value calculated based on formula $[(X-Y)/X \cdot 100]$, where X represents a gas concentration before light irradiation and Y represents a gas concentration when the gas concentrations are measured.

In one embodiment, the acetaldehyde decomposition rate provided by the desired level of photocatalytic activity is at least about 10% in about 1 hour with above-mentioned illumination. In a preferred embodiment, the decomposition rate is at least about 30% in about 1 hour. In a more preferred embodiment, the rate is 50% in about 1 hour. In another embodiment, the decomposition rate is at least about 80% in about 1 hour.

In one embodiment, a photocatalyst material contains the photocatalyst powder according to the embodiment whose content falls within a range of not less than 0.1 molar % nor more than 99 molar %. In another embodiment, a photocatalyst coating material contains the photocatalyst material according to the embodiment whose content falls within a range of not less than 1 molar % nor more than 90 molar %.

The photocatalyst material, compositions, and dispersions described herein can be used as a disinfectant, an odor eliminator, a pollutant eliminator, a self-cleaner, an antimicrobial agent and the like. The materials, compositions, and dispersions can be used to interact with air, liquid, microbial and/or solid substances. In one embodiment, they can be used to clean air such as in confined environments such as in aircraft fuselages or in more contaminated environments such as auto garages. In other embodiments, they can be used for antimicrobial properties such as to coat surfaces in need of disinfection such as food service or production facilities or hospitals or clinics.

In some embodiments, methods are utilized wherein polluted air is exposed to light and a photocatalyst material, composition, or dispersion as described herein thereby removing pollutants from the air.

In some embodiments, light and a photocatalyst material, composition, or dispersion can remove about 50%, about 60%, about 70%, about 80%, about 90%, about 95% or more of the pollution in the air.

In another embodiment, methods are utilized wherein polluted water is exposed to light and a photocatalyst material, composition, or dispersion as described herein thereby reducing the amount of contaminant in the water.

In some embodiments, light and a photocatalyst material, composition, or dispersion can remove about 50%, about 60%, about 70%, about 80%, about 90%, about 95% or more of the pollution from the water.

In other embodiments, methods are utilized wherein biological contaminants are exposed to light and a photocatalyst material, composition, or dispersion as described herein thereby disinfecting the biological material. In some embodiments, biological materials can include food products.

In some embodiments, light and a photocatalyst material, composition, or dispersion can remove about 50%, about 60%, about 70%, about 80%, about 90%, about 95% or more of the contamination from the biological material in the air.

The following is a listing of embodiments that are specifically contemplated herein.

Embodiment 1

A photocatalytic composition comprising a photocatalyst and a co-catalyst.

Embodiment 2

The photocatalytic composition of embodiment 1, wherein the co-catalyst improves the catalytic performance of the photocatalyst by at least about 2, as measured by the rate of photocatalytic decomposition of acetaldehyde.

Embodiment 3

The photocatalytic composition of any preceding embodiment, wherein the photocatalyst and the co-catalyst have refractive indices that are within about 0.75 of each other.

Embodiment 4

The photocatalytic composition of any preceding embodiment, wherein the photocatalyst has a band gap of about 1.5 eV to about 3.5 eV.

Embodiment 5

The photocatalytic composition of any preceding embodiment, wherein the photocatalyst comprises $WO_3$, $TiO_2$, or $Ti(O,C,N)_2$:Sn.

Embodiment 6

The photocatalytic composition of any preceding embodiment, wherein the co-catalyst is a metal oxide capable of being reduced by electron transfer from the conduction band of the photocatalyst.

Embodiment 7

The photocatalytic composition of any preceding embodiment, wherein the co-catalyst is a metal oxide capable of reducing $O_2$ by electron transfer.

Embodiment 8

The photocatalytic composition of embodiment 7, wherein the co-catalyst is capable of converting atmospheric $O_2$ to superoxide radical ion.

Embodiment 9

The photocatalytic composition of embodiment 8, wherein the co-catalyst is capable of converting atmospheric $O_2$ to superoxide radical ion under ambient conditions.

Embodiment 10

The photocatalytic composition of any preceding embodiment, wherein the co-catalyst comprises anatase $TiO_2$, $SrTiO_3$, $KTaO_3$, or $KNbO_3$.

Embodiment 11

The photocatalytic composition of any preceding embodiment, wherein the co-catalyst comprises $In_2O_5$, $Ta_2O_5$, anatase $TiO_2$, rutile $TiO_2$, a combination of anatase and rutile $TiO_2$, or $CeO_2$.

Embodiment 12

The photocatalytic composition of any preceding embodiment, wherein the co-catalyst is a metal dioxide.

Embodiment 13

The photocatalytic composition of embodiment 12, wherein the co-catalyst is $CeO_2$.

Embodiment 14

The photocatalytic composition of embodiment 12, wherein the $CeO_2$ is doped with Sn.

Embodiment 15

The photocatalytic composition of embodiment 14, wherein the Sn is about 1 molar % to about 20 molar % of the co-catalyst.

Embodiment 16

The photocatalytic composition of embodiment 12, wherein the co-catalyst is $TiO_2$.

Embodiment 17

The photocatalytic composition of any preceding embodiment, wherein the co-catalyst has a valence band or a highest occupied molecular orbital that is higher than a valence band of the photocatalyst.

Embodiment 18

The photocatalytic composition any preceding embodiment, wherein the photocatalyst is capable of transferring a hole to the photocatalyst.

Embodiment 19

The photocatalytic composition of any preceding embodiment, comprising at least about 0.01 molar % photocatalyst and less than 100 molar % photocatalyst.

Embodiment 20

The photocatalytic composition of any preceding embodiment, wherein the photocatalyst is an oxide semiconductor.

Embodiment 21

The photocatalytic composition of any preceding embodiment, wherein the photocatalyst comprises titanium (Ti).

Embodiment 22

The photocatalyst composition of any preceding embodiment, wherein the photocatalyst comprises tungsten (W).

Embodiment 23

The photocatalytic composition of any preceding embodiment, where the photocatalyst is doped with at least one naturally occurring element.

Embodiment 24

The photocatalyst composition of any preceding embodiment, where the photocatalyst is loaded with a transition metal, a transition metal oxide, or a transition metal hydroxide.

Embodiment 25

The photocatalyst composition of embodiment 24, wherein the transition metal is Cu, Fe, or Ni.

Embodiment 26

The photocatalyst composition of embodiment 24, wherein the transition metal oxide comprises Cu, Fe, or Ni.

Embodiment 27

The photocatalyst composition of embodiment 24, wherein the transition metal hydroxide comprises Cu, Fe, or Ni.

Embodiment 28

The photocatalytic composition of any preceding embodiment, where the photocatalyst is loaded with a noble metal, a noble metal oxide, or a noble metal hydroxide.

Embodiment 29

The photocatalyst composition of embodiment 28, where the noble metal is Au, Ag, Pt, Pd, Ir, Ru, or Rh.

Embodiment 30

The photocatalyst composition of embodiment 28, wherein the noble metal oxide comprises Au, Ag, Pt, Pd, Ir, Ru, or Rh.

Embodiment 31

The photocatalyst composition of embodiment 28, wherein the noble metal hydroxide comprises Au, Ag, Pt, Pd, Ir, Ru, or Rh.

Embodiment 32

The photocatalytic composition of any preceding embodiment, wherein the co-catalyst is inorganic.

Embodiment 33

The photocatalytic composition of embodiment 32, wherein the inorganic co-catalyst comprises a binder.

Embodiment 34

The photocatalytic composition of any preceding embodiment, wherein the co-catalyst is $SiO_2$, $SnO_2$, $Al_2O_3$, $ZrO_2$, $Fe_2O_3$, $Fe_3O_4$, NiO, or $Nb_2O_5$

Embodiment 35

The photocatalytic composition of any preceding embodiment, wherein the co-catalyst comprises $Re_rE_tO_s$ where Re is a rare earth metal and $1 \le r \le 2$, $2 \le s \le 3$, E is an element, and $0 \le t \le 3$.

Embodiment 36

The photocatalytic composition of embodiment 35, wherein the co-catalyst further comprises $Ce_xZr_yO_2$ wherein the y/x ratio=0.001 to 0.999.

Embodiment 37

The photocatalytic composition of embodiment 35, wherein the co-catalyst comprises $Re_rO_s$ where Re is a rare earth metal and $1 \le r \le 2$, $1 \le s \le 2$.

Embodiment 38

The photocatalytic composition of any preceding embodiment, wherein the co-catalyst comprises cerium.

Embodiment 39

The photocatalytic composition of any preceding embodiment, wherein the co-catalyst comprises a cerium oxide.

Embodiment 40

The photocatalytic composition of any preceding embodiment, wherein the photocatalyst comprises $WO_3$ and the co-catalyst comprises $CeO_x$ ($x \le 2.0$).

Embodiment 41

The photocatalytic composition of any preceding embodiment, wherein the composition is capable of photocatalytically decomposing acetaldehyde.

Embodiment 42

A photocatalytic layer comprising the photocatalytic composition of any of embodiments 1-41.

Embodiment 43

A photocatalytic layer of embodiment 42 further comprising a substrate, wherein at least a portion of the photocatalyst composition contacts the substrate surface.

Embodiment 44

A method of making a photocatalytic layer comprising forming a composition of any of embodiments 1-41; and applying the compositions to a substrate.

Embodiment 45

A method for making a photocatalytic layer comprising:
  creating a dispersion comprising a photocatalyst, $CeO_2$, and a dispersing media, wherein the respective photocatalyst and $CeO_2$ refractive indices are within at least 0.75 of each other, the molar ratio of the photocatalyst to $CeO_2$ being between 1-99 molar % photocatalyst and 99-1 molar % $CeO_2$;
  wherein the dispersion has about 2-50 wt % solid materials;
  applying the dispersion to a substrate; and
  heating the dispersion and the substrate at a sufficient temperature and length of time to evaporate substantially all the dispersing media from the dispersion.

Embodiment 46

The method of embodiment 45, wherein the molar ratio of photocatalyst to $CeO_2$ is about 1:1 [50% to 50%].

Embodiment 47

The method of embodiment 45, wherein the molar ratio of photocatalyst to $CeO_2$ is about 4:1 [80% to 20%].

Embodiment 48

The method of embodiment 45, wherein the amount of dispersing media added is sufficient to attain a dispersion of about 20 wt % solid materials

Embodiment 49

The method of embodiment 45, wherein the substrate is heated at a temperature between room temperature and 500° C.

Embodiment 50

The method of embodiment 45, wherein the substrate is heated for a time between 10 seconds and 2 hours.

Embodiment 51

A method of purifying air or water, comprising exposing the air or water to light in the presence of a photocatalytic composition of any of embodiments 1-41.

Embodiment 52

The method of embodiment 51 wherein the photocatalytic composition removes greater than about 50% of the pollution in the air or water.

Embodiment 53

A method of removing a pollutant, comprising exposing a material comprising the pollutant to light in the presence of a photocatalytic composition of any of embodiments 1-41.

Embodiment 54

A method of disinfecting comprising exposing the air or water to light in the presence of a photocatalytic composition of any of embodiments 1-41.

Embodiment 55

A method of eliminating odor from air or water comprising exposing the air or water to light in the presence of a photocatalytic composition of any of embodiments 1-41.

Embodiment 56

A self cleaning material comprising a photocatalytic composition of any of embodiments 1-41.

Embodiment 57

The method of any embodiments 51-55 wherein the photocatalytic composition is applied to glass, wallboards, stone, masonry, metals, woods, plastics, other polymeric surfaces, concrete, fibers, textiles, yarns, or ceramics.

Embodiment 58

The method of embodiment 57 wherein the photocatalytic composition is applied by vapor deposition, such as chemical vapor deposition (CVD) or physical vapor deposition (PVD); laminating; pressing; rolling; soaking; melting; gluing; sol-gel deposition; spin coating; dip coating; bar coating; slot coating; brush coating; sputtering; thermal spraying, such as flame spray, plasma spray (DC or RF); high velocity oxy-fuel spray (HVOF); atomic layer deposition; cold spraying; or aerosol deposition.

Sample Preparation

All materials were used without further purification unless otherwise indicated. All materials were purchased from Sigma Aldrich (St. Louis, Mo., USA) unless otherwise indicated.

Example 1

$WO_3$ photocatalyst (200 mg), as prepared according to the method described earlier in this disclosure, was added to water. The resulting dispersion was then added to 740 mg of $CeO_2$ sol (Nissan Chemical NanoUse CE-20B). The mole ratio of $CeO_2$ and $WO_3$ was chosen to be 1:1 (50 molar % to 50 molar %). Then a sufficient amount of RO (reverse osmosis treated) water (800 mg) was added to the resulting dispersion in order to make a coating solution which is about 20 wt % solid materials in water. The resulting dispersion was homogenized using an ultrasonic homogenizer. A glass substrate (50 mm×75 mm) was coated with the prepared resultant by using a spin coater (1200 rpm/40 sec). The coated substrate was heated for about 2 minutes at about 120° C. The resulting coated substrate was transparent (about 86% at about 555 nm). Photocatalytic activity was determined by monitoring the acetaldehyde degradation ratio to about 81% after 1 hour of blue light-emitting diode (LED) (455 nm, 200 mW/cm$^2$) irradiation.

Example 2

Coated substrate 2 was made in a similar manner to Example 1, except that $SiO_2$ sol (Nissan Chemical SNOWTEX O, 258 mg) was added instead of $CeO_2$ sol. The resulting coated substrate was transparent (90% at about 555 nm). Photocatalytic activity as determined by the acetaldehyde degradation ratio was about 50% after irradiation under conditions similar to Example 1.

Example 3

Coated substrate 3 was made in a similar manner to Example 1, except that $SiO_2$ sol (Nissan-Chemical SNOWTEX 20 L, 258 mg) was added instead of $CeO_2$ sol. The resulting obtained substrate was transparent (91% at 555 nm). Photocatalytic activity as determined by the acetaldehyde degradation ratio was about 67% after irradiation under conditions similar to Example 1.

Comparative Example 1

Comparative Example 1 was prepared in a manner similar to Example 1, except that silicone resin (Shin-Etsu Chemical, SCR-1012) was used instead of $CeO_2$ sol. The ratio of $WO_3$ was about 20 wt % in silicone resin. Glass substrate (50 mm×75 mm) was coated with the prepared solution by doctor blade. After 120° C. heating for curing, the obtained substrate was translucent. The resulting obtained substrate exhibited a transparency of about 75% at 555 nm. Photocatalytic activity as determined by the acetaldehyde degradation ratio was about 1% after irradiation under conditions similar to Example 1.

Comparative Example 2

Comparative Example 2 was prepared in a manner similar to Example 1, except that poly (methyl methacrylate) (PMMA) was dispersed in acetone. The ratio of $WO_3$ was about 20 wt % in PMMA and no water was added. Glass substrate (50 mm×75 mm) was coated with the prepared solution by doctor blade. After 120° C. heating for curing, the obtained substrate was translucent. The resulting obtained substrate exhibited a transparency of about 78% at 555 nm. The acetaldehyde degradation ratio was 0.5% after irradiation under conditions similar to Example 1.

Comparative Example 3

$WO_3$ (0.8 g) was added to $Al_2O_3$ sol (Nissan Chemical Alumina-sol200, 5 g). The mole ratio of $Al_2O_3$ and $WO_3$ was chosen to be 1:1 by weight. Then RO water (5.8 g) was added in order to make a coating solution which is 14 wt % solid materials in water. A glass substrate (50 mm×75 mm) was coated with the prepared solution by using a spin coater (1200 rpm/40 sec). After heating at about 120° C. for evaporation of the liquid, the obtained substrate was translucent. The resulting obtained substrate was transparent (91% at 555 nm). The acetaldehyde degradation ratio was about 0% after irradiation under conditions similar to Example 1.

Example 4

30 mL of 5 mM Tungstic acid ($WO_3.H_2O$) and 30 mL of HF2% solution (e.g., $WO_3$ precursor), were added to 40 ml of boric acid ($H_3BO_3$). Two 75 mm×25 mm silicon wafers were immersed in the resulting solution and stirred for about 6 hours at about 30° C. The layered substrate was removed from the solution and annealed at about 400° C. for about 1 hour resulting in a coated glass slide (Example 4). A coating solution was prepared with sufficient $CeO_2$ sol (Nissan Chemical NanoUse CE-20B) to attain a mole ratio of $CeO_2$ and $WO_3$ of about 1:1 (50 molar % to 50 molar %). Example 4a was then made by spin coating the substrate of Example 4, as discussed above, with the $CeO_2$ coating solution in a manner similar to that described in Example 1.

Figure 3:
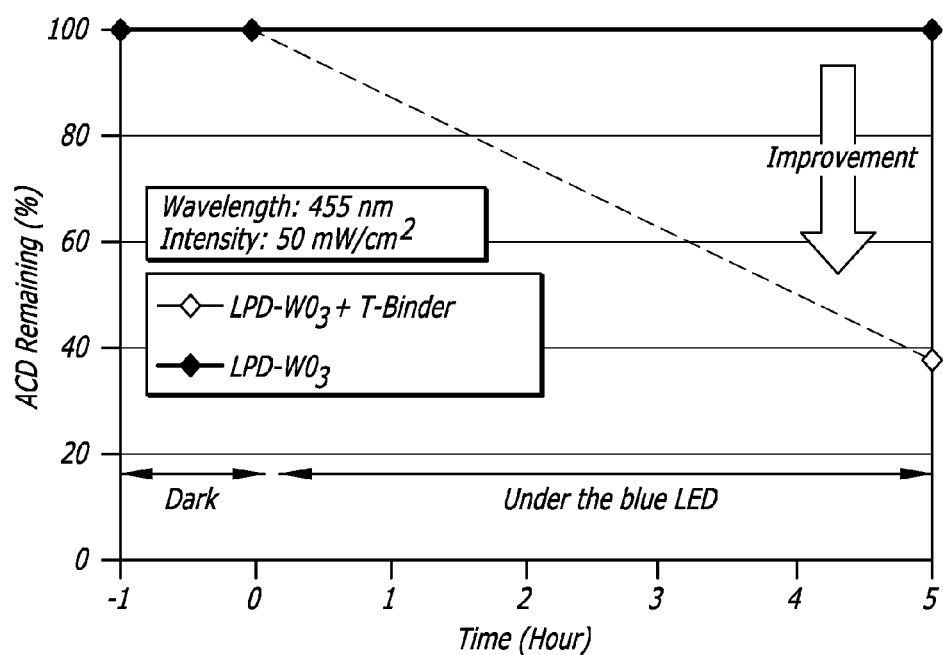
FIG. 3 is a graph illustrating T-binder performance data.

The spin coated glass slides prepared in accordance with Example 4 and 4a above, were heated at about 120° C. on a hot plate under full spectrum irradiation by a Xe lamp (lamp power output about 300 W) for about 1 hour. Each slide was then sealed in a separate 5 L Tedlar bag under vacuum, followed by injecting about 3 L of ambient air and about 80 mL of 3500 ppm acetaldehyde. Each bag was lightly massaged for about 2 minutes by hand then placed in the dark for about 15 min. The acetaldehyde concentration was estimated by Gas Chromotagraphy-Flame Ionization Detector (GC-FID) to be at 80±2 ppm. Each Tedlar bag containing a sample was placed back in the dark for about 1 hour. The slide/Tedlar bag was exposed to array blue LED of 455 nm with light intensity of 50 mW/cm$^2$. A sample was collected every 30 minutes by an automated injection port of GC-FID and the amount of remaining acetaldehyde was estimated at subsequent 30 minute intervals. FIG. 3 is a graph illustrating T-binder performance data. The graph shows that generally when a T-binder is combined with $WO_3$, performance is improved when compared to bare $WO_3$.

Examples 5-7

5 g of $WO_3$ (Global Tungsten & Powder, Towanda, Pa., USA [GTP]) was added to high purity alumina ball mill jars containing about 50 g of $ZrO_2$ balls of about 3 mm in diameter and was ground by ball mill (SFM-1 model Desktop Planetary Ball Miller (MTI Corp. location) in 25 mL methanol for about 4 hours to obtain ground $WO_3$ (GTP) with a smaller particle size. Plasma-$WO_3$ was made in a manner similar to that described in U.S. Pat. No. 8,003,563, which is hereby incorporated by reference in its entirety.

Additional glass slides were made and placed in a Tedlar bag in a similar manner to that described in Example 4, except that 200 mg each of $WO_3$ (GTP) (Example 5w/, Example 5a w/out), Ground $WO_3$ (GTP) (Example 6w/, Example 6a w/out) and plasma-$WO_3$ (Example 7w/, Example 7a w/out) each with and without $CeO_2$ were spin-coated on glass substrate instead of LPD-$WO_3$. When $CeO_2$ was used, the molar ratio of each type of $WO_3$ to $CeO_2$ was 1:1.

Figure 4:
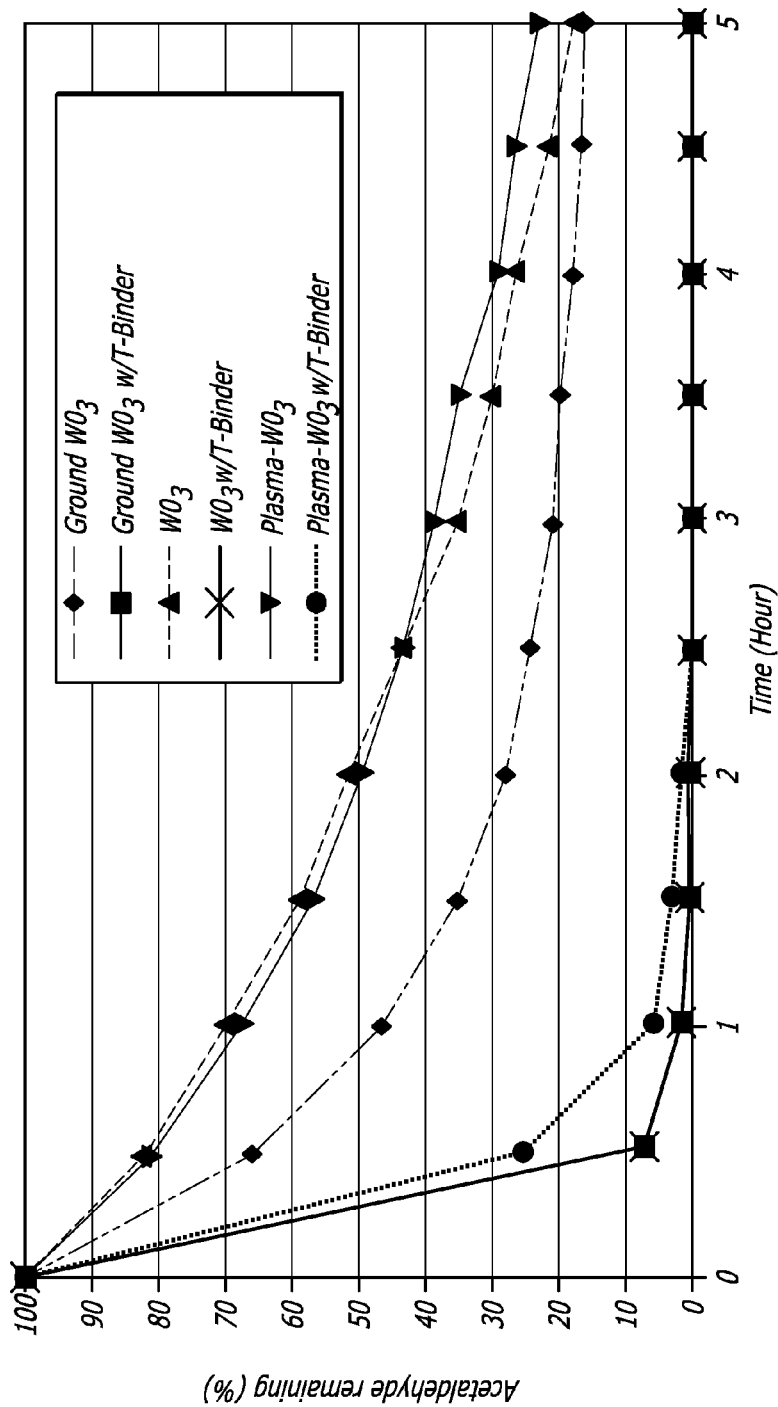
FIG. 4 is a plot of acetaldehyde decomposition for the photocatatyst compositions of Examples 5-7.

The spin-coated slides $WO_3$, Ground $WO_3$, find and plasma-$WO_3$ each with and without $CeO_2$ were prepared and were tested for acetylaldehyde degradation as described in Example 4. The results are shown in FIG. 4.

Examples 8A-8J

In another example (Example 8), additional slides were made in a manner similar to that of Example 1, except that the amount of $CeO_2$ sol added was varied to attain different molar ratios of $WO_3:CeO_2$ (e.g., 0%, 0.1%, 5%, 10%, 30%, 50%, 75%, 90%, 95%, 100%) ((100−x) $WO_3$+(x) T-binder).

Figure 5:
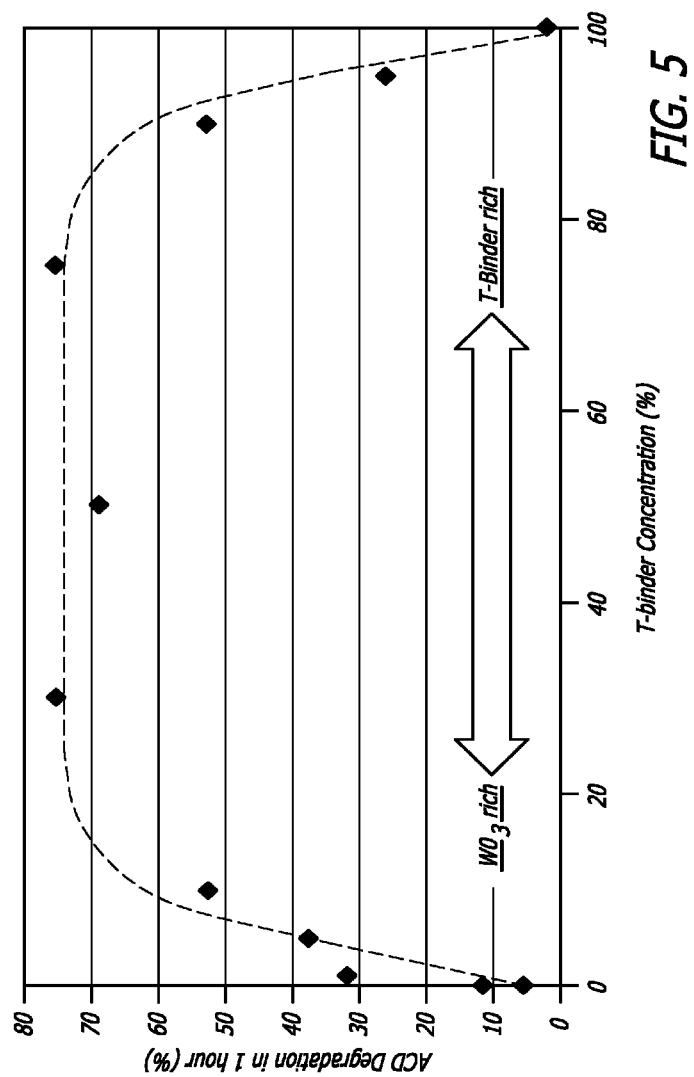
FIG. 5 is a plot of acetaldehyde decomposition at one hour for a photocatalyst composition comprising $WO_3$ and T-binder at various ratios.

FIG. 5 shows the acetaldehyde degradation estimated after 1 hour of exposure to 270 mW/cm$^2$ blue LED array light.

Examples 9-15

In another example (Example 9), an additional slide was made in the following manner: plasma $WO_3$ powder (130 mg) and $CeO_2$ powder (96.5 mg) (about a 1:1 mole ratio) were dispersed first in RO water (20 wt % of solid) and bath sonicated (VWR B3500A-MT) for about 10 minutes and then probe sonicated (Sonic dismembrator Model 100, continuous mode) for about 5 minutes. Then, the mixture/composite/blend was spin coated on a 75 mm×50 mm glass slide and annealed as described in Example 4.

Additional slides were made in a similar manner, except that various other materials were used instead of $CeO_2$, as set forth in Table 1:

TABLE 1

| Example | Plasma WO3 | T binder Material |
|---|---|---|
| 9 | 130 mg | Aldrich $CeO_2$ = 96.5 mg |
| 10 | 130 mg | Anatase $TiO_2$ = 44.78 mg |
| 11 | 130 mg | $KTaO_3$ = 150.3 mg |
| 12 | 130 mg | $KNbO_3$ = 100.93 mg |
| 13 | 130 mg | $SrTiO_3$ = 102.89 mg |
| 14 | 130 mg | SiC = 22.5 mg |
| 15 | 130 mg | $TiO_2$ = 44.78 mg and $CeO_2$ = 96.5 mg |

Figure 6:
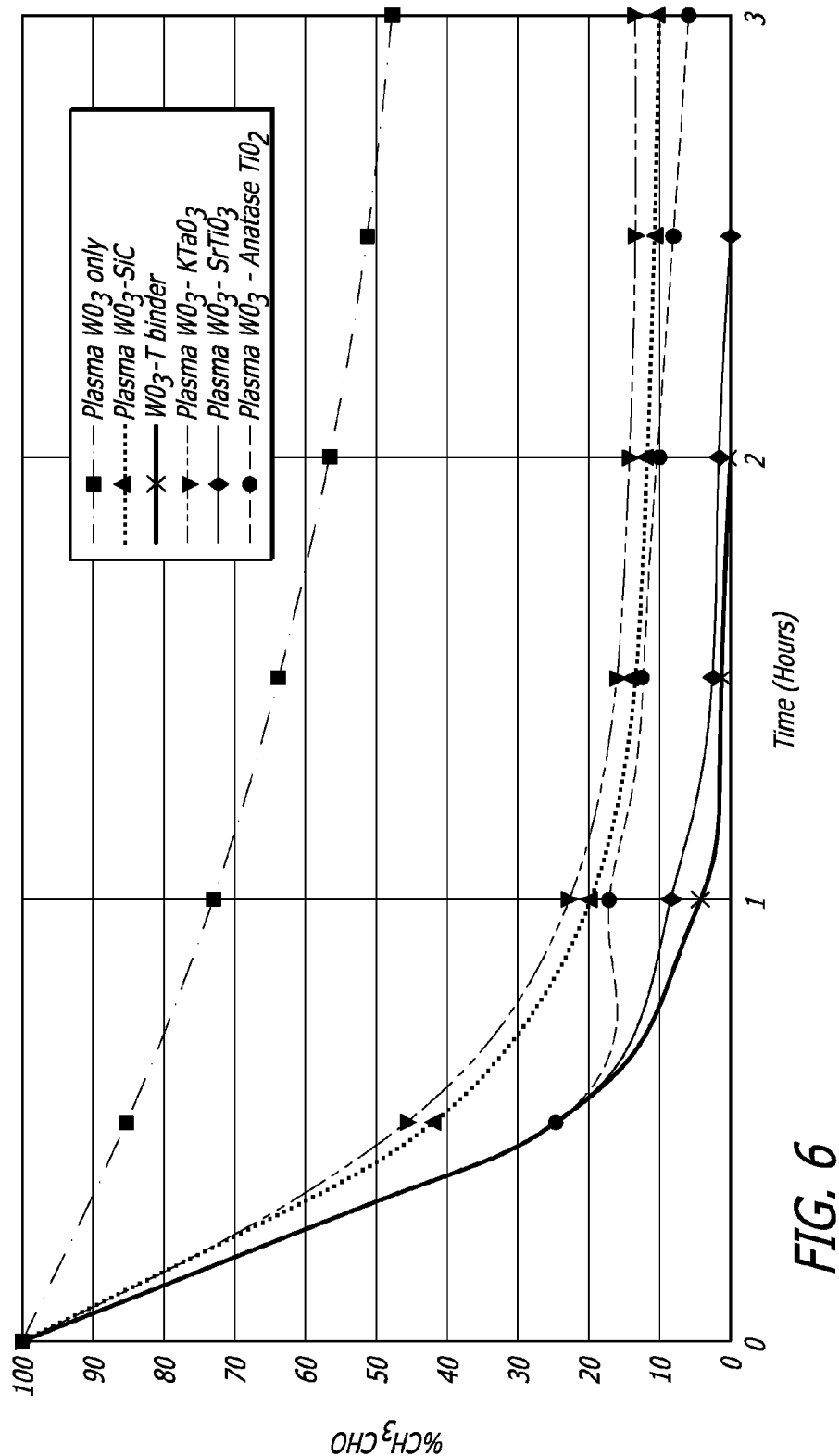
FIG. 6 is a plot of acetaldehyde decomposition for the photocatatyst compositions of Examples 9-15.

Each glass slide was tested for acetylaldehyde degradation in a manner similar to that described in Example 4, except that the applied light intensity was about 270 mW/cm$^2$. The results are shown in FIG. 6.

Figure 7:
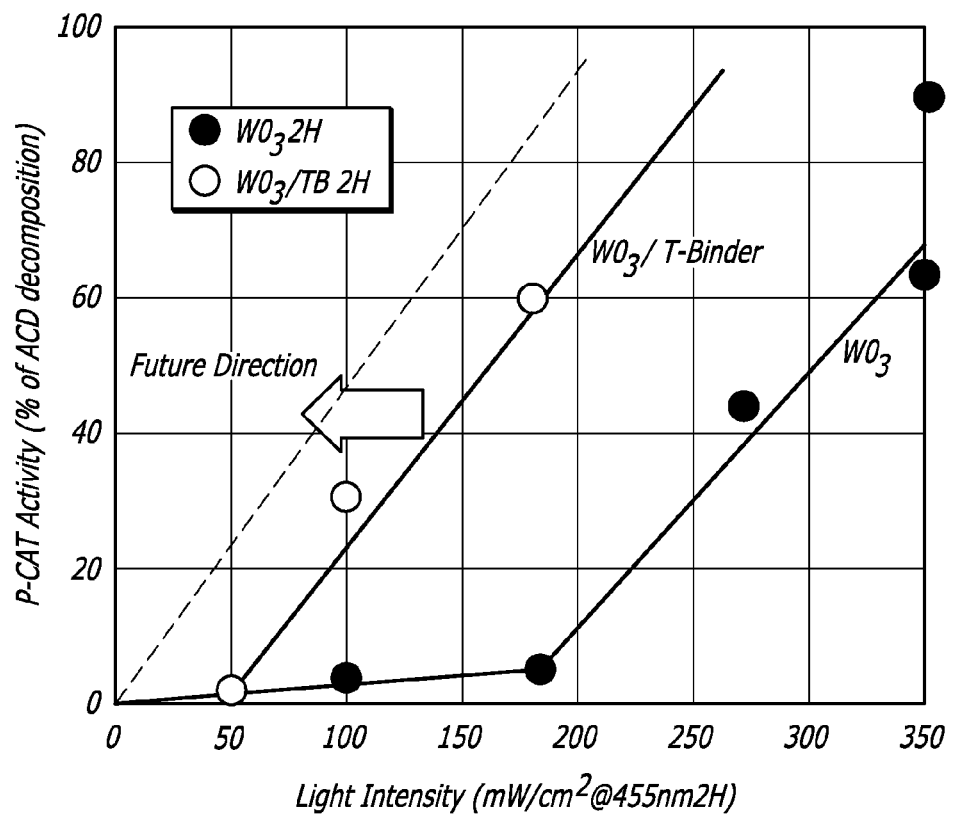
FIG. 7 is a plot of acetaldehyde decomposition for $WO_3$ and $WO_3$/T-Binder at varying light intensity at 455 nm.

In another example, each glass slide made above was tested in a manner similar to that described immediately above, except that each slide was exposed to varied light intensity (from about 50 mW/cm$^2$ to about 350 mW/cm$^2$). The results are shown in FIG. 7.

Examples 16-30

In addition, in another example, about 130 mg of powdered sample from various compounds (see Table 2) were each separately dissolved in a minimal amount of RO water and homogenized for about 5 minutes. The compounds were then combined with $WO_3$ in a 1:1 molar ratio according to the process described in Example 1.

TABLE 2

| Example | 16 | 17 | 18 | 19 | 20 | 21 | 22 | 23 |
|---|---|---|---|---|---|---|---|---|
| compound | CuO | $MoO_3$ | $MnO_3$ | $Y_2O_3$ | $Gd_2O_3$ | $CeO_2$-combustion | Plasma $WO_3$ | $Nb_2O_5$ |
| Example | 24 | 25 | 26 | 27 | 28 | 29 | 30 | |
| compound | $In_2O_3$ | $Ta_2O_5$ | Rutile + Anatase $TiO_2$ | $CeO_2$ (Nippon) | $CeO_2$ (Aldrich) | Plasma $CeO_2$ | Anatase $TiO_2$ anatase | |

Figure 8:
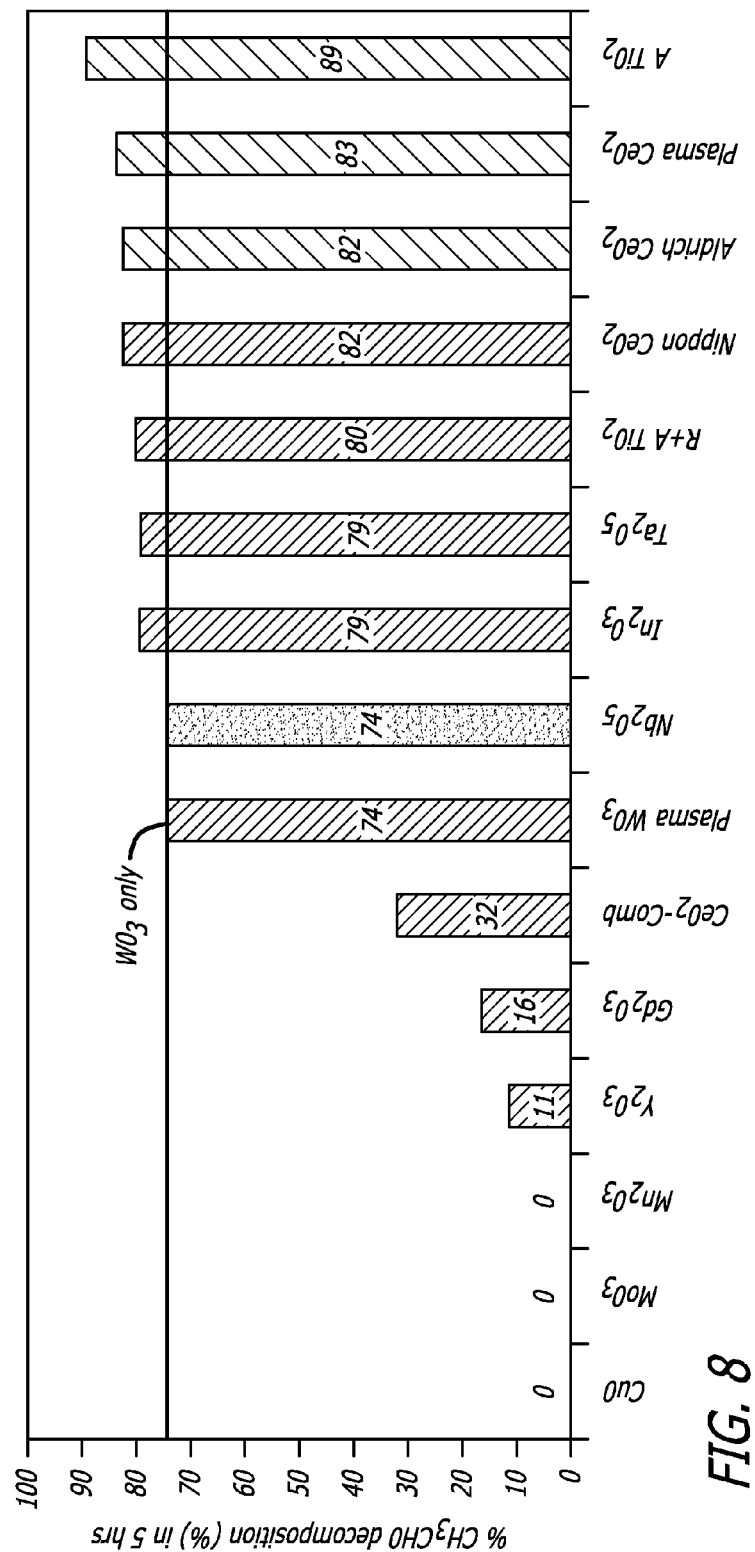
FIG. 8 is a graph of acetaldehyde decomposition after 5 hours for WO3 with co-catalysts of Examples 16-30 at a 1:1 molar ratio.

A clean petri dish was wiped with ethanol and the inside surface of the dish was ionized with a corona device for about 1 to 2 minutes. The homogeneous sample of each compound was poured into the treated petri dish and then heated at about 120° C. while swirling to achieve uniform distribution of the sample as it dried. After the sample had dried, the petri dish was placed under a UV lamp (300 W) for about 1 hour. The petri dish was then inserted into a Tedlar bag and tested in a manner similar to that described for Example 4. The results are shown in FIG. 8.

Example 31-35

In another example, 3.78 g of Tin (II) 2-ethylhexanoate [also known as tin (II) octoate and/or stannous octoate] (Spectrum Chemicals, Gardena, Calif., USA), 5 g of $Ce(NO_3)_3 \cdot 6H_2O$ (Sigma Aldrich, St. Louis, Mo., USA), and 3.0 g of ammonium nitrate ($NH_4NO_3$) (Sigma Aldrich, St. Louis, Mo., USA) were dissolved in about 25 mL of RO treated water. 1.129 g maleic hydrazide was then added just before the mixture was heated to about 150° C. and stirred for about 20 minutes.

The resultant precursor mixture was then heated at about 450° C. for about 40 minutes in a preheated muffle furnace under ambient atmosphere and pressure conditions. The resultant powder was annealed at about 500° C. for about 20 minutes. The resultant powder was mixed with $WO_3$ in a 1:1 molar ratio used in a manner similar to that described in Example 1 to make a coated glass slide and then was tested on its ability to degrade acetylaldehyde following the procedure described in Example 4.

Other powders were made in a similar manner, except that the amounts, of materials and/or other parameters were used as set forth in Table 3:

TABLE 3

Combustion synthesis of Tin doped and undoped $CeO_2$

| Nominal Composition | Precursors amount | Combustion temperature | Annealing temperature |
| --- | --- | --- | --- |
| Example 31 [7.5 mol % Sn in $CeO_2$] | $Ce(NO_3)_3 \cdot 6H_2O$ = 5 g<br>Sn octoate = 0.378 g<br>$NH_4NO_3$ = 3 g<br>Maleic Hydrazide = 1.129 g | 450° C. | 500° C./20 min |
| Example 32 [5 mol % Sn in $CeO_2$] | $Ce(NO_3)_3 \cdot 6H_2O$ = 5 g<br>Sn octoate = 0.245 g<br>$NH_4NO_3$ = 3 g<br>Maleic Hydrazide = 1.127 g | 450° C. | 500° C./20 min |
| Example 33 [2.5 mol % Sn in $CeO_2$] | $Ce(NO_3)_3 \cdot 6H_2O$ = 5 g<br>Sn octoate = 0.1196 g<br>$NH_4NO_3$ = 3 g<br>Maleic Hydrazide = 1.129 g | 450° C. | 500° C./20 min |
| Example 34 [0 mol % Sn in $CeO_2$] | $Ce(NO_3)_3 \cdot 6H_2O$ = 5 g<br>Maleic Hydrazide = 1.129 g | 450° C. | 500° C./20 min |
| Example 35 [0 mol % Sn in $CeO_2$] | $Ce(NO_3)_3 \cdot 6H_2O$ = 5 g<br>Maleic Hydrazide = 1.129 g | 300° C. | — |

Figure 9:
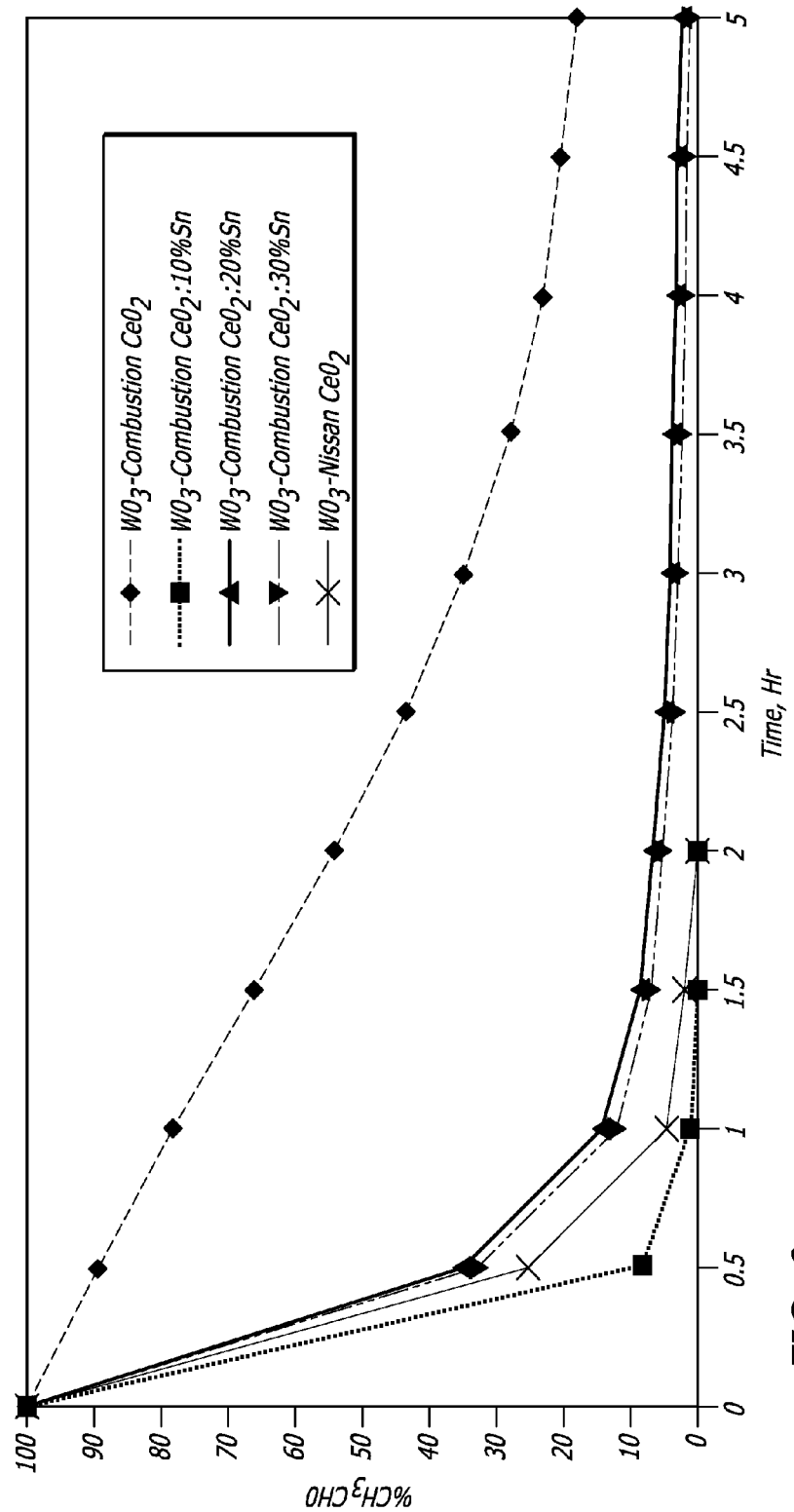
FIG. 9 is a plot of acetaldehyde decomposition for the photocatatyst compositions of Examples 31-35.

The combustion synthesized powders were incorporated in a similar manner onto a glass slide as described in Example 3 and was tested as described in Example 4. The results are shown in FIG. 9. As seen in FIG. 9, $WO_3$ combined with Sn doped $CeO_2$ showed enhanced acetaldehyde degradation as compared with $WO_3$ combined with undoped $CeO_2$.

Example 36: Combination of Combustion $Ti(O,C,N)_2$:Sn and Plasma $CeO_2$ Towards Acetaldehyde Degradation In another example, $Ti(O,C,N)_2$:Sn was combined with plasma $CeO_2$ powder (1:1 mole ratio) in a similar manner to that described in Example 1, except that $Ti(O,C,N)_2$:Sn powder was used instead of $WO_3$ powder, and was spin coated on a glass micro slide as described in Example 1. The $Ti(O,C,N)_2$:Sn was synthesized as described in co-pending U.S. Patent Provisional Application Ser. No. 61/608,754, filed Mar. 8, 2012, which is hereby incorporated by reference in its entirety, by an aqueous combustion method employing glycine (1.4 g) as a completely decomposable fuel in addition to titanium (IV) bis ammonium lactate dihydroxide (7 mL of 50 wt % aqueous solution), tin octoate (0.883 g) and ammonium nitrate (3.5 g) at 300° C. followed by annealing at 400° C. for 30 min in the box furnace. A glass slide made in a manner similar to that of the previous examples was tested for acetaldehyde degradation as also earlier described in Example 4 (at 270 mW/cm$^2$ light intensity). 7% Acetaldehyde degradation was observed after 5 hours of exposure for the $Ti(O,C,N)_2$:Sn photocatalyst coated glass slide in a Tedlar bag. When, a glass slide with both $Ti(O,C,N)_2$:Sn and $CeO_2$ (1:1 mole ratio) was tested in a Tedlar bag in a similar manner, the acetaldehyde degradation increased to 22% after 5 hours of exposure.

Example 37: Reducing Odor on an Airliner

A dispersion including a photocatalyst composition as described herein is provided as a coating on a thin adhesive film. This adhesive film is used to coat the ceiling of a Boeing 737. The photocatalyst composition can react with ambient light from light emitting diode light fixtures above the overhead bins to generate reactive airborne species that can reduce odor in the air.

Example 38: Disinfecting Food Preparation Surfaces

A photocatalyst resin capable of being applied as a spray is provided to a food preparation factory to coat its work surfaces. The resin can be applied in a heated or unheated state in order to properly bond with a work surface. All surfaces that are to come into contact with food in the factory are sprayed with the resin.

The factory is equipped with organic light emitting diode light fixtures for general lighting. This ambient light can react with the resin surface thereby creating oxygen radicals on the surface. These radicals can react with food contaminants thereby rendering the food safe. As a result of applying the resin to the work surfaces, instances of bacteria spreading into the food supply has reduced 50%.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A photocatalytic layer comprising a photocatalyst and a co-catalyst,
   wherein the photocatalyst comprises tungsten oxide and has photocatalytic activity,
   wherein the co-catalyst comprises cerium oxide,
   wherein the molar ratio of the tungsten oxide to the cerium oxide is from 1:5 to 7:3; and
   wherein the cerium oxide and tungsten oxide in the photocatalytic layer are crystallized.

2. The photocatalytic layer of claim 1, wherein the co-catalyst improves the catalytic performance of the photocatalyst by at least about 1.2 times, as measured by the rate of photocatalytic decomposition of acetaldehyde.

3. The photocatalytic layer of claim 1, wherein the photocatalyst has a band gap of about 1.5 eV to about 3.5 eV.

4. The photocatalytic layer of claim 1, where the photocatalyst is doped with a naturally occurring element.

5. The photocatalytic layer of claim 1, where the photocatalyst is loaded with a transition metal, a transition metal oxide, or a transition metal hydroxide.

6. The photocatalytic layer of claim 1, wherein the photocatalyst comprises $WO_3$.

7. The photocatalytic layer of claim 1, wherein the co-catalyst is a metal oxide capable of being reduced by electron transfer from the conduction band of the photocatalyst.

8. The photocatalytic layer of claim 1, wherein the co-catalyst is a metal oxide capable of reducing $O_2$ by electron transfer.

9. The photocatalytic layer of claim 1, wherein the co-catalyst is capable of converting atmospheric $O_2$ to superoxide radical ion.

10. The photocatalytic layer of claim 8, wherein the co-catalyst is capable of converting atmospheric $O_2$ to superoxide radical ion.

11. The photocatalytic layer of claim 1, wherein the co-catalyst comprises $Ce_xZr_yO_2$ wherein the y/x ratio is about 0.001 to about 1.

12. The photocatalytic layer of claim 1, wherein the co-catalyst comprises $Re_rO_s$ where Re is a rare earth metal and r is 1 to 2, and s is 1 to 2.

13. A photocatalytic composition comprising a photocatalyst and a co-catalyst wherein the photocatalyst comprises $WO_3$ and the co-catalyst comprises $CeO_2$ that is doped with Sn.

14. The photocatalytic composition of claim 13, wherein the Sn is about 1 molar % to about 20 molar % of the co-catalyst.

15. The photocatalytic layer of claim 1, wherein the co-catalyst has a valence band or a highest occupied molecular orbital that is higher than a valence band of the photocatalyst.

16. The photocatalytic layer of claim 1, wherein the photocatalyst is capable of transferring a hole in a valence band of the photocatalyst to a higher occupied molecular orbital or a valence band of the co-catalyst.

17. The photocatalytic layer of claim 1, wherein the layer is capable of photocatalytically decomposing acetaldehyde.

18. The photocatalytic layer of claim 1, wherein the molar ratio of the tungsten oxide to the cerium oxide is from 1:2 to 7:3.

19. The photocatalytic layer of claim 1, wherein the molar ratio of the tungsten oxide to the cerium oxide is from 3:7 to 7:3.

20. A method of removing a pollutant, comprising exposing a material comprising the pollutant to light in the presence of the photocatalytic layer of claim 1.

21. The method of claim 20, comprising disinfecting the material.

22. The method of claim 20, comprising removing an odor.

* * * * *